US010288335B2

(12) United States Patent
Aschan et al.

(10) Patent No.: US 10,288,335 B2
(45) Date of Patent: May 14, 2019

(54) REFRIGERATOR HAVING A REFRIGERATION SYSTEM WITH FIRST AND SECOND CONDUIT PATHS

(71) Applicant: Electrolux Home Products Corporation N. V., Brussels (BE)

(72) Inventors: Andreas Aschan, Stockholm (SE); Richard Furberg, Stockholm (SE)

(73) Assignee: Electrolux Home Products Corporation N.V., Brussels (BE)

(*) Notice: Subject to any disclaimer, the term of this patent is extended or adjusted under 35 U.S.C. 154(b) by 0 days.

(21) Appl. No.: 14/431,565

(22) PCT Filed: Sep. 28, 2012

(86) PCT No.: PCT/EP2012/069168
§ 371 (c)(1),
(2) Date: Mar. 26, 2015

(87) PCT Pub. No.: WO2014/048482
PCT Pub. Date: Apr. 3, 2014

(65) Prior Publication Data
US 2015/0241099 A1 Aug. 27, 2015

(51) Int. Cl.
*F25B 49/02* (2006.01)
*F25B 5/02* (2006.01)
(Continued)

(52) U.S. Cl.
CPC ................ *F25B 49/02* (2013.01); *F25B 5/02* (2013.01); *F25B 40/02* (2013.01); *F25D 11/022* (2013.01);
(Continued)

(58) Field of Classification Search
CPC ............. F25B 5/02; F25B 40/00; F25B 40/02
(Continued)

(56) References Cited

U.S. PATENT DOCUMENTS 4,696,168 A * 9/1987 Woods ...................... F25B 5/02 165/145
5,113,668 A * 5/1992 Wachs, III .............. F25B 40/02 62/280
(Continued)

FOREIGN PATENT DOCUMENTS

CN 1667331 A 9/2005
CN 101762109 A 6/2010
(Continued)

OTHER PUBLICATIONS

Chen, CN201983530U, European Patent Office, English Translation.*
(Continued)

*Primary Examiner* — Frantz F Jules
*Assistant Examiner* — Steve S Tanenbaum
(74) *Attorney, Agent, or Firm* — Pearne & Gordon LLP

(57) ABSTRACT

A refrigerator (2) comprising a refrigeration system (4) being at least intermittently flowed through by a refrigerant and a first compartment (6) cooled by the refrigeration system (4) is provided. System components comprise a single compressor (10), a condenser (12), a first expansion arrangement (14), a second expansion arrangement (16), a first evaporator (18), and a sub-cooler (20) comprising a first refrigerant channel (22) and a second refrigerant channel (24). The refrigeration system (4) comprises a first conduit path (26) and a second conduit path (28), the first conduit path (26) comprising the first refrigerant channel (22), the first expansion arrangement (14), and the first evaporator (18), and the second conduit path (28) comprising the second expansion arrangement (16) and the second refrigerant channel (24). A flow control device (30) for alternately directing refrigerant through the first conduit path (26) and the second conduit path (28) is arranged in the refrigeration
(Continued)

system (4). Further a method of controlling a refrigerator is provided.

25 Claims, 5 Drawing Sheets

(51) Int. Cl.

| | |
|---|---|
| ***F25D 29/00*** | (2006.01) |
| ***F25D 11/02*** | (2006.01) |
| ***F25B 40/02*** | (2006.01) |
| *F25B 40/00* | (2006.01) |

(52) U.S. Cl.
CPC .............. *F25D 29/00* (2013.01); *F25B 40/00* (2013.01); *F25B 2400/13* (2013.01); *F25B 2400/24* (2013.01); *F25B 2600/0251* (2013.01); *F25B 2600/2507* (2013.01); *F25B 2600/2511* (2013.01); *F25B 2700/2111* (2013.01); *Y02B 40/32* (2013.01)

(58) Field of Classification Search
USPC ........................................................... 62/115
See application file for complete search history.

(56) References Cited

U.S. PATENT DOCUMENTS

| | | | | |
|---|---|---|---|---|
| 5,228,308 | A | 7/1993 | Day et al. | |
| 6,167,722 | B1 * | 1/2001 | Kasezawa | F25B 41/04 62/505 |
| 6,374,631 | B1 * | 4/2002 | Lifson | F25B 1/04 62/117 |
| 6,385,981 | B1 * | 5/2002 | Vaisman | F04C 29/0014 62/196.3 |
| 6,446,450 | B1 * | 9/2002 | Pressler | F25B 41/04 62/150 |
| 6,820,434 | B1 | 11/2004 | Gutheim et al. | |
| 2002/0148239 | A1 * | 10/2002 | Trieskey | F25B 5/02 62/79 |
| 2003/0070441 | A1 * | 4/2003 | Moon | F24F 11/83 62/225 |
| 2006/0096308 | A1 * | 5/2006 | Manole | F25B 9/008 62/277 |
| 2007/0214829 | A1 * | 9/2007 | Otake | F25B 39/022 62/515 |
| 2008/0295529 | A1 * | 12/2008 | Kawaguchi | F25B 49/022 62/126 |
| 2009/0025405 | A1 * | 1/2009 | Yanik | F25B 40/00 62/117 |
| 2010/0054978 | A1 * | 3/2010 | Ueda | F04C 18/3564 418/60 |
| 2010/0162751 | A1 | 7/2010 | Nishijima et al. | |
| 2011/0083456 | A1 * | 4/2011 | Wakamoto | F25B 41/00 62/115 |

FOREIGN PATENT DOCUMENTS

| | | | | |
|---|---|---|---|---|
| CN | 201983530 | U | * | 9/2011 |
| CN | 201983530 | U | * | 9/2011 |
| JP | 2010014311 | A | * | 1/2010 |
| JP | 2010014311 | A | * | 1/2010 |

OTHER PUBLICATIONS

Chen, CN201983530U, European Patent Office, English Translation (Year: 2011).*

International Search Report for PCT/EP2012/069168, dated Jul. 4, 2013, 2 pages.

* cited by examiner

REFRIGERATOR HAVING A REFRIGERATION SYSTEM WITH FIRST AND SECOND CONDUIT PATHS

TECHNICAL FIELD

The present invention relates to a refrigerator comprising a sub-cooler. The present invention further relates to a method of controlling a refrigerator, more specifically a method of controlling a refrigeration system of a refrigerator.

BACKGROUND

A refrigerator comprises a refrigeration system arranged to cool at least one compartment of the refrigerator. The temperature inside the compartment may be either above 0 degrees Celsius or below 0 degrees Celsius. A refrigerant circulates at least intermittently in the refrigeration system. The refrigeration system comprises a compressor, a condenser, an expansion arrangement, and an evaporator. Gaseous refrigerant is compressed in the compressor and condenses to liquid phase in the condenser. Passing through the expansion arrangement, the pressure of the liquid refrigerant is reduced. The liquid refrigerant at low pressure evaporates in the evaporator. The evaporator is arranged in thermal communication with the compartment of the refrigerator. Thus, the evaporator cools the compartment.

EP 1035387 discloses a refrigeration system comprising one compressor and an efficiency raising heat exchanger, referred to as a sub-cooler, arranged after the condenser before the expansion valve/arrangement. When a compressor of the refrigeration system is running, the so called sub-cooler is continuously flowed through by liquid refrigerant from an outlet side of a condenser and by gaseous refrigerant from an outlet side of an evaporator of the refrigeration system.

KR 2011-0116334 discloses a refrigerator and freezer with sub-cooler. From FIG. 3 of KR 2011-0116334 it may be deduced that the refrigerator/freezer comprises two parallel refrigeration circuits leading from a condenser via sub-coolers back to a compressor. It is apparent from FIGS. 3 and 4 of KR 2011-0116334 that refrigerant flows simultaneous thorough both parallel circuits and that the pressure is reduced to the same low level in both circuits before the gaseous refrigerant is introduced in the compressor. Apparently, the primary purpose of the refrigerator/freezer is to provide an efficient evaporation of refrigerant in the evaporator. Expansion losses in the refrigeration system illustrated in FIG. 3 of KR 2011-0116334 are the same as in the refrigeration system disclosed in FIGS. 1 and 2 of KR 2011-0116334, i.e. a refrigeration system without sub-coolers.

EP 658730 discloses a refrigeration system comprising a low stage compressor and two high stage compressors, and utilizing an economizer/sub-cooler. The refrigeration system may be utilized in air-conditioning and/or food coolers in a supermarket as well as frozen food cases in grocery stores. Valves are provided for selectively supplying gas from the economizer/sub-cooler to motors of the compressors or to the high stage compressor. In the refrigeration system high stage compressor capacity may be increased.

There exists a need for increased efficiency in single compressor refrigerators.

SUMMARY

An object of the present invention is to provide an energy efficient refrigerator comprising a single compressor.

According to an aspect of the invention, the object is achieved by a refrigerator comprising a refrigeration system being at least intermittently flowed through by a refrigerant and a first compartment cooled by the refrigeration system. The refrigeration system comprises a system of conduits and system components. The system of conduits interconnects the system components. The system components comprise a single compressor, a condenser, a first expansion arrangement, a second expansion arrangement, a first evaporator, and a sub-cooler comprising a first refrigerant channel and a second refrigerant channel. The refrigeration system comprises a first conduit path and a second conduit path. The first conduit path comprises the first refrigerant channel, the first expansion arrangement, and the first evaporator. The second conduit path comprises the second expansion arrangement and the second refrigerant channel. The first and second conduit paths extend in parallel. A flow control device for alternately directing refrigerant through the first conduit path and the second conduit path is arranged in the refrigeration system.

In the refrigerator, the first and second conduit paths are kept separated by means of the flow control device such that refrigerant flows either through the first conduit path or through the second conduit path. Accordingly, refrigerant flows alternately through part of the first conduit path at a low pressure level and through part of the second conduit paths at a higher pressure level to the compressor. Thus, as refrigerant flows through the second conduit path and the second channel of the sub-cooler, the sub-cooler is cooled, and when refrigerant flows through the first conduit path and the first channel of the sub-cooler, the sub-cooler is utilized for sub-cooling refrigerant flowing to the first evaporator. Expansion losses in the refrigeration system of the refrigerator are thus reduced. As a result, the above mentioned object is achieved.

Expansions losses comprise fluid flow friction loss in an expansion arrangement of a refrigeration system. A capillary tube is an example of an expansion arrangement. An expansion arrangement may alternatively e.g. comprise a thermostatic or electronic expansion valve. The fluid flow friction is mainly caused by gaseous refrigerant flowing together with liquid refrigerant through the expansion arrangement and being subjected to a pressure reduction. The fluid flow friction results in heat being generated in the refrigerant, which heat cannot be utilized in the refrigeration system—therefore being referred to as a loss. Herein the term "single compressor" is understood to mean one compressor only, which compressor has one compression stage only or one compressor having several internal compression stages, however the compressor having only one external inlet and one external outlet, i.e. only two connections for refrigerant. The first and second channels of the sub-cooler are in thermal communication with each other. The term "compressor" when used herein, is to be interpreted to refer to a "single compressor".

The refrigerator may be a domestic or commercial refrigerator for foodstuffs. The refrigeration system is intermittently flowed through by the refrigerant due to the compressor being switched on and off based on the cooling requirements of e.g. the first compartment. Accordingly, the refrigerant circulates in the refrigeration system while the compressor is running. As mentioned above, the refrigerant flows through one of the first and second conduit paths at a time. As the refrigerant circulates, the gaseous refrigerant coming from the compressor is cooled and condenses to a liquid state in the condenser. The liquid refrigerant is subjected to a pressure drop in the first or second expansion arrangement and cools at least the first compartment as it evaporates from the liquid state in the first evaporator, the first evaporator being in thermal communication with the first compartment. The refrigerator may comprise a control system 100, which may be adapted to control the refrigerator, e.g. implementing the method according to aspects and embodiments discussed herein. The control system 100 may be adapted to control e.g. the flow control device and the compressor. The control system 100 may comprise temperature sensors 102 arranged in thermal communication with the first compartment, the first evaporator and/or the sub-cooler. The control system 100 may be set to maintain the temperature in the first compartment above 0 degrees Celsius or below 0 degrees Celsius. The refrigerator may comprise a second compartment. In this case e.g. the first compartment may have a below 0 degrees Celsius temperature and the second compartment may have an above 0 degrees Celsius temperature. The first and second compartments may be provided with separate doors.

According to a further aspect of the invention, the object is achieved by a method of controlling the refrigeration system of a refrigerator according to any aspects or embodiments discussed herein. The method comprises:

- running the compressor when a first temperature condition of the refrigerator is fulfilled,
- setting the flow control device in a sub-cooling setting to direct the flow of refrigerant through the second conduit path for a sub-cooling duration,
- setting the flow control device in a first evaporator setting to direct a flow of refrigerant through the first conduit path for a first evaporation duration, the sub-cooling duration and the first evaporation duration together forming a cycle, and
- stopping the compressor when a second temperature condition of the refrigerator is fulfilled.

In the sub-cooling setting, the sub-cooler is cooled by refrigerant flowing through the second conduit path and the second channel of the sub-cooler. In the first evaporator setting, the refrigerant is cooled in the sub-cooler as it flows through the first channel of the sub-cooler before it expands in the first expansion arrangement. Since the refrigerant is cooled in the sub-cooler when it flows through the first conduit path the available cooling capacity of the refrigerant available for evaporation in the first evaporator is increased compared to if the refrigerant where not to flow through the cooled sub-cooler on its way to the first evaporator. Thus, for a particular amount of compressor work (e.g. in Joule) a higher cooling capacity is achieved. As a result, the above mentioned object is achieved.

As discussed above, the method may be performed by a control system of a refrigerator. The first and second temperature conditions of the refrigerator may for instance be temperature conditions inside the first compartment and/or inside a second compartment, or temperature conditions of evaporators of the refrigeration system.

Further features of, and advantages with, the present invention will become apparent when studying the appended claims and the following detailed description. Those skilled in the art will realize that different features of the present invention may be combined to create embodiments other than those described in the following, without departing from the scope of the present invention, as defined by the appended claims.

BRIEF DESCRIPTION OF THE DRAWINGS

The various aspects of the invention, including its particular features and advantages, will be readily understood from the following detailed description and the accompanying drawings, in which.

DETAILED DESCRIPTION

The present invention will now be described more fully with reference to the accompanying drawings, in which example embodiments are shown. However, this invention should not be construed as limited to the embodiments set forth herein. Disclosed features of example embodiments may be combined as readily understood by one of ordinary skill in the art to which this invention belongs. Like numbers refer to like elements throughout. Well-known functions or constructions will not necessarily be described in detail for brevity and/or clarity.

Figure 1:
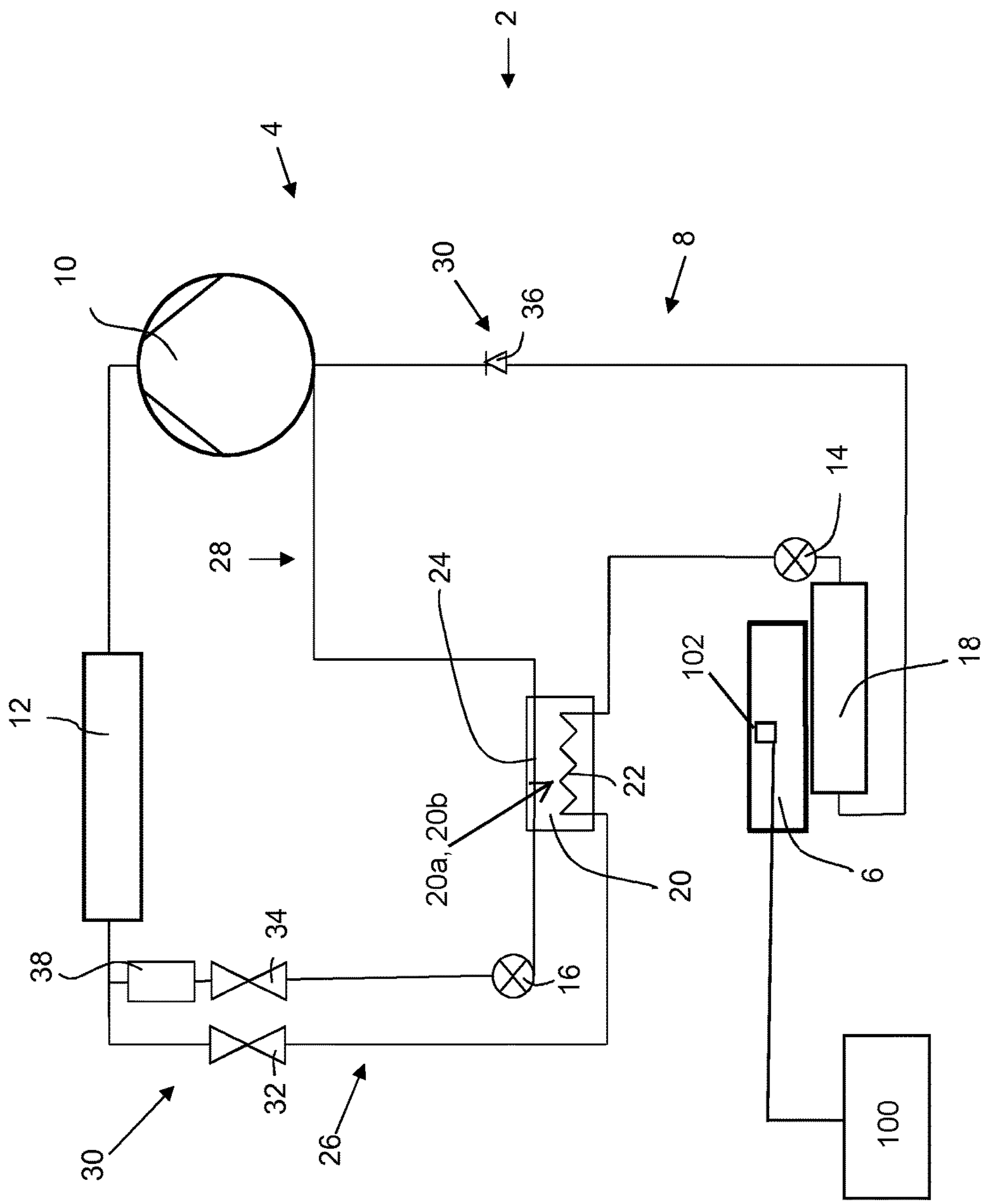
FIGS. 1-3 illustrate schematically refrigerators comprising refrigeration systems according to embodiments.

FIG. 1 illustrates schematically a refrigerator 2 according to embodiments. The refrigerator 2 comprises a refrigeration system 4 and a first compartment 6 cooled by the refrigeration system. The refrigeration system 4 comprises a system of conduits 8 and various system components, the system of conduits 8 interconnecting the system components. A refrigerant circulates at least intermittently through the refrigeration system 4. The system components comprise inter alia a single compressor 10, a condenser 12, a first expansion arrangement 14, a second expansion arrangement 16, a first evaporator 18, and a sub-cooler 20. The sub-cooler 20 comprises a first refrigerant channel 22 and a second refrigerant channel 24. The first and second refrigerant channels 22, 24 are arranged in thermal communication with each other. The first evaporator 18 is in thermal communication with the first compartment 6. The first compartment 6 may be cooled either to a temperature above 0 degrees Celsius or below 0 degrees Celsius, inter alia depending on the refrigerant in the refrigeration system 4 and the pressure level in first evaporator 18.

The refrigeration system 4 comprises a first conduit path 26 and a second conduit path 28. The first and second conduit paths 26, 28 divide downstream of the condenser 12. The first and second conduit paths 26, 28 meet upstream of the compressor 10. The first conduit path 26 comprises the first refrigerant channel 22, the first expansion arrangement 14, and the first evaporator 18. The first expansion arrangement 14 is arranged downstream of the first refrigerant channel 22 of the sub-cooler 20 and upstream of the first evaporator 18. The second conduit path 28 comprises the second expansion arrangement 16 and the second refrigerant channel 24. The first and second conduit paths 26, 28 extend in parallel. A flow control device 30 for alternately directing refrigerant through the first conduit path 26 and the second conduit path 28 is arranged in the refrigeration system 4. The system of conduits 8 extends, seen in the flow direction of the refrigerant, from the compressor 10 to the condenser 12, and from the condenser 12 to the flow control device 30. Due to the flow control device 30 alternately directing refrigerant through the first conduit path 26 and the second conduit path 28, the refrigerant circulates in the refrigeration system 4, when the compressor 10 is running, through the compressor 10 and the condenser 12 and either the first conduit path 26 or the second conduit path 28.

Two different low pressure levels are reached in parts of the first and second conduit paths 26, 28. When refrigerant flows through the first conduit path 26, the pressure in the first evaporator 18 is comparatively lower than the pressure in the second conduit path 28, after the second expansion device 16, when refrigerant flows through the second conduit path 28. As mentioned above, when refrigerant flows through the second conduit path 28 and the second channel 24 of the sub-cooler 20, the sub-cooler 20 is cooled. When refrigerant flows through the first conduit path 26 and the first channel 22 of the sub-cooler 20, the sub-cooler 20 is utilized for sub-cooling refrigerant flowing to the first evaporator 18. That is, in the sub-cooler 20, heat is transferred from the first conduit path 26 to the second conduit path 28. Sub-cooling the refrigerant before the first evaporator 18, e.g. before it is subjected to a pressure drop in the first expansion arrangement 14, provides a larger cooling capacity in the first evaporator 18 than if the refrigerant would not be sub-cooled, as will be illustrated with the diagram of FIG. 4 below.

Due to the alternating flow of refrigerant through the first and second conduit paths 26, 28, the sub-cooler 20 requires a thermal mass for achieving the transfer of heat mentioned above. Thus, the sub-cooler 20 forms a thermal energy storage unit. In this manner the sub-cooler 20 may be cooled by the refrigerant which previously has been subjected to a pressure drop in the second expansion arrangement 16 as the refrigerant flows through the second conduit path 28, directed by the flow control device 30. Refrigerant may evaporate in the second refrigerant channel 24 of the sub-cooler 20. When the refrigerant flows through the first conduit path 26 instead, directed by the flow control device 30, the refrigerant is cooled in the first refrigerant channel 22 of the sub-cooler 20 before the refrigerant is subjected to a pressure drop in the first expansion arrangement 14. The thermal energy storage unit may e.g. comprise a phase change material (PCM) 20*a*, or a liquid, such as liquid water or a water mixture, or a metal body 20*b*.

In these embodiments the flow control device 30 comprises a first valve 32 arranged in the first conduit path 26 and a second valve 34 arranged in the second conduit path 28. Accordingly, at least part of the flow control device 30 is arranged downstream of the condenser. Further, the flow control device comprises a check valve 36 in the first conduit path 26 arranged downstream of the first evaporator 18 and upstream of the compressor 10. The check valve 36 prevents refrigerant from the second conduit path 28 to flow into the first conduit path 26. As an alternative to a check valve 36 there may instead be provided a 2-way-valve which is opened when refrigerant flows through the first conduit path 26 and closed when the refrigerant flows through the second conduit path 28.

An accumulator 38 may be arranged in the second conduit path 28. The accumulator 38 forms a liquid refrigerant reservoir, which is used when the control device 30 closes the first conduit path 26 and opens the second conduit path 28. Refrigerant is thus immediately available to flow through the second conduit path 28. The accumulator 38 may be omitted.

Figure 2:
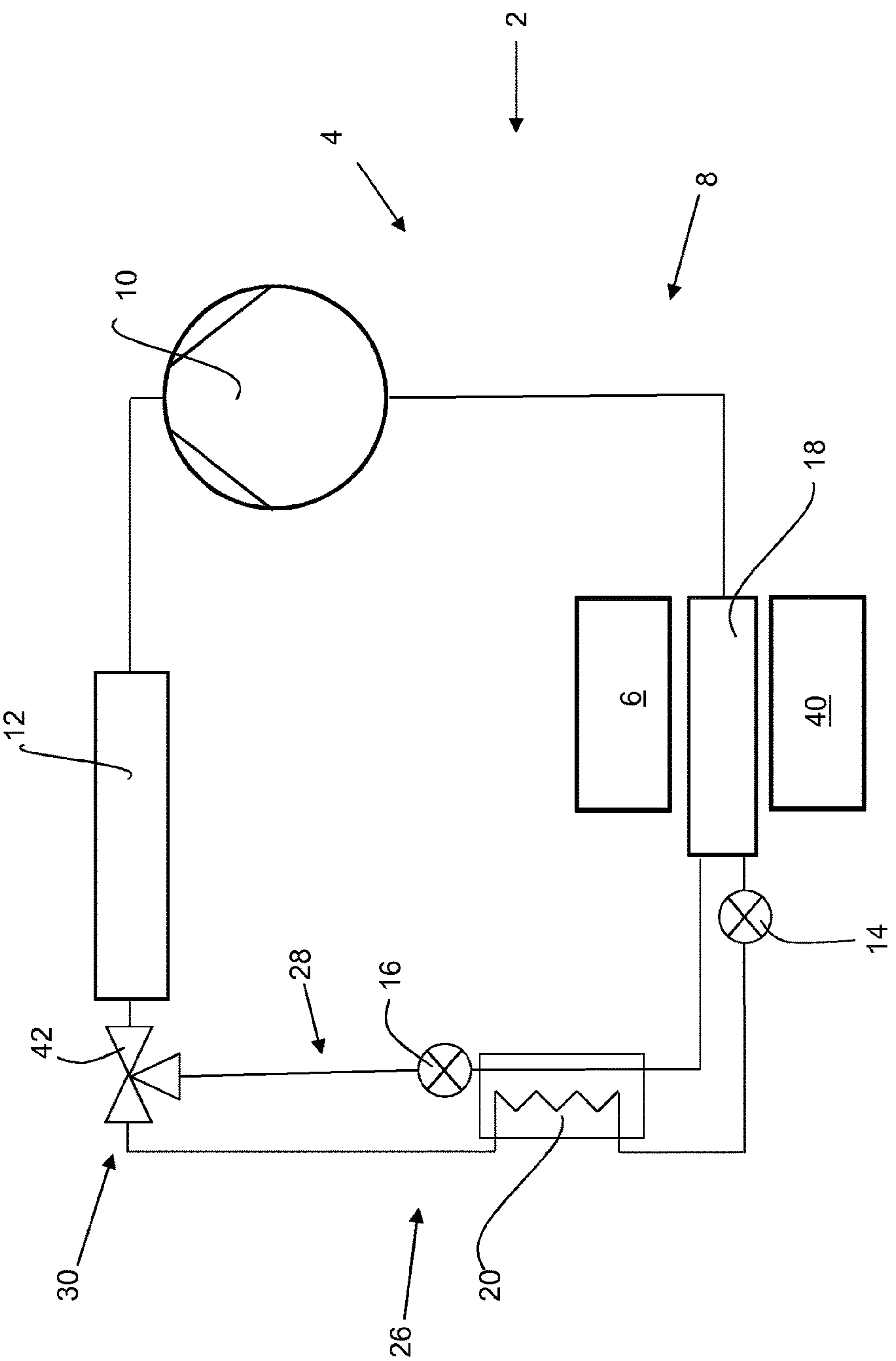

FIG. 2 illustrates schematically a refrigerator 2 according to embodiments. The main differences to the FIG. 1 embodiments are discussed below. The refrigerator 2 comprises a second compartment 40 and the second conduit path 28 comprises the first evaporator 18. The flow control device 30 comprises a three-way valve 42 which directs the refrigerant from the condenser 12 to either the first or the second conduit path 26, 28. In these embodiments the first evaporator 18 is operated alternately at a high pressure level and a low pressure level. That is, when refrigerant flows through the first conduit path 26, the pressure in the first evaporator 18 is comparatively low, and when refrigerant flows through the second conduit path 28, the pressure in the first evaporator 18 is comparatively high. At the high pressure level, the evaporation temperature of the refrigerant is comparatively high and the temperature of the first evaporator is comparatively high. Conversely, at the low pressure level, the temperature of the first evaporator 18 is comparatively low. Thus, the first and second compartments 6, 40 may be cooled at two different temperatures; one may be cooled to a temperature above 0 degrees Celsius and the other to a temperature below 0 degrees Celsius. The first evaporator 18 is selectively arranged in thermal communication with either the first or the second compartment 6, 40, e.g. by direction an airflow from the first evaporator 18 to the first or the second compartment 6, 40.

Figure 3:
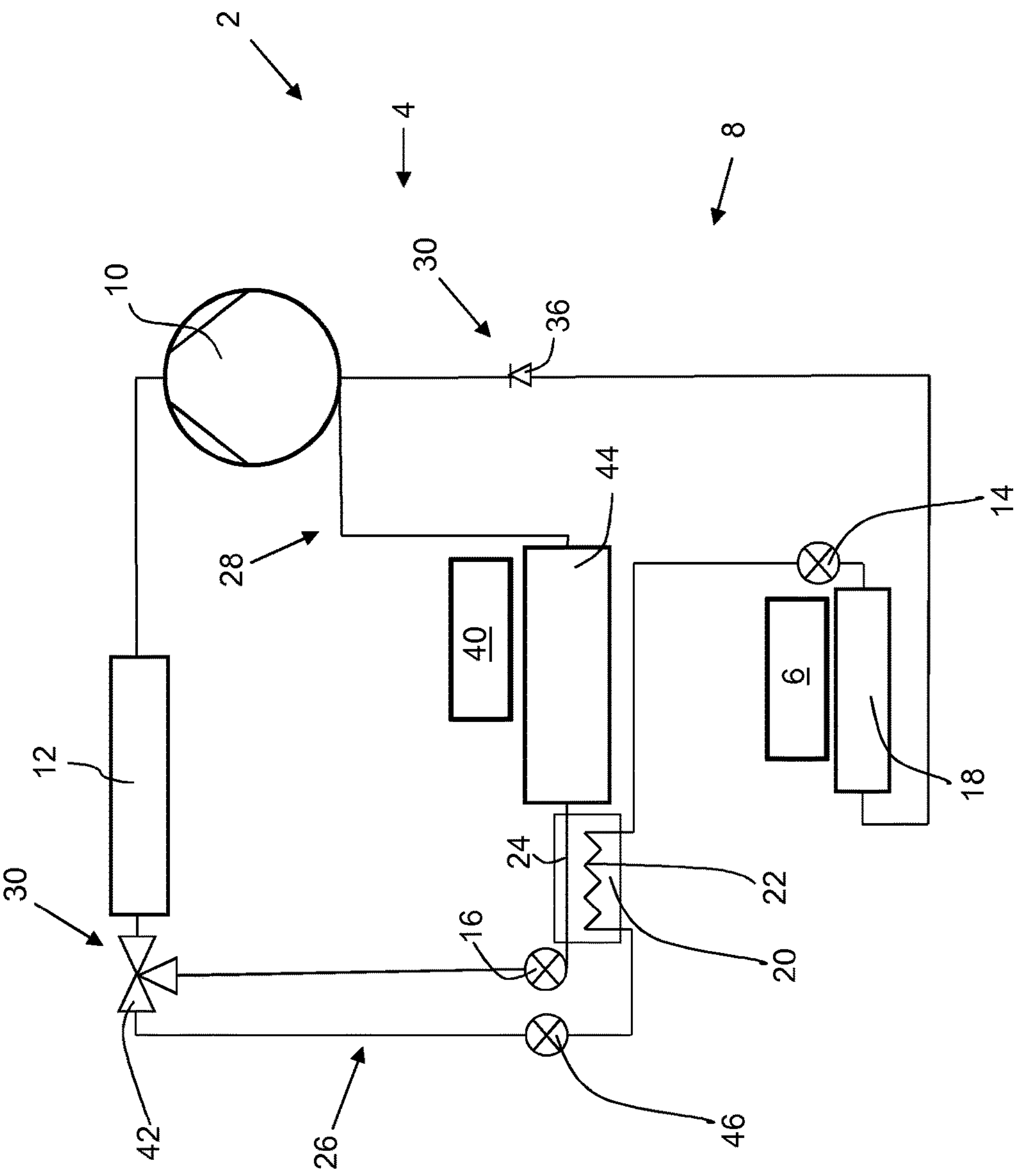

FIG. 3 illustrates schematically a refrigerator 2 according to embodiments. These embodiments resemble in much the FIG. 1 embodiments. The main differences to the FIG. 1 embodiments are discussed below. The flow control device 30 comprises a three-way valve 42 which directs the refrigerant from the condenser 12 to either the first or the second conduit path 26, 28. Again, the flow control device 30 further comprises a check valve 36. The refrigerator 2 comprises a second compartment 40 and the second conduit path 28 comprises a second evaporator 44. The first evaporator 18 is in thermal communication with the first compartment 6 and the second evaporator 44 is in thermal communication with the second compartment 40. Thus, the first compartment 6 is cooled when the refrigerant flows through the first conduit path 26 and the second compartment is cooled when refrigerant flows through the second conduit path 28. As there is a pressure difference between the first and second evaporators 18, 44, the first and second compartments 6, 40 are cooled at two different temperatures. Since the pressure in the second evaporator 44 is higher than in the first evaporator 18, the second compartment 40 may be cooled to a temperature above 0 degrees Celsius and the first compartment may be cooled to a temperature below 0 degrees Celsius. In alternative embodiments both compartments 6, 40 may be cooled to a temperature above 0 degrees Celsius or to a temperature below 0 degrees Celsius.

While refrigerant flows through the second conduit path 28 and the second compartment 40 is cooled, the refrigerant flows through the second refrigerant channel 24 of the sub-cooler 20. This is utilised to sub-cool the refrigerant in the first refrigerant channel 22 when the refrigerant flows through the first conduit path 26 and the first compartment 40 is cooled. The second refrigerant channel 24 of the sub-cooler 20 is arranged upstream of the second evaporator 44. Alternatively, the second evaporator 44 may comprise the second refrigerant channel 24 of the sub-cooler 20. That is, the second refrigerant channel 24 may form at least part of a flow path extending through the second evaporator 44.

A third expansion arrangement 46 is arranged in the first conduit path 26. The third expansion arrangement 46 is arranged downstream of the condenser 12 and upstream of first refrigerant channel 22 of the sub-cooler 20. The third expansion arrangement 46 provides a pressure drop in the refrigerant before the refrigerant reaches the first refrigerant channel 22. This may ensure that a homogenous and stable flow of refrigerant reaches the first refrigerant channel 22 under different working conditions.

Figure 4:
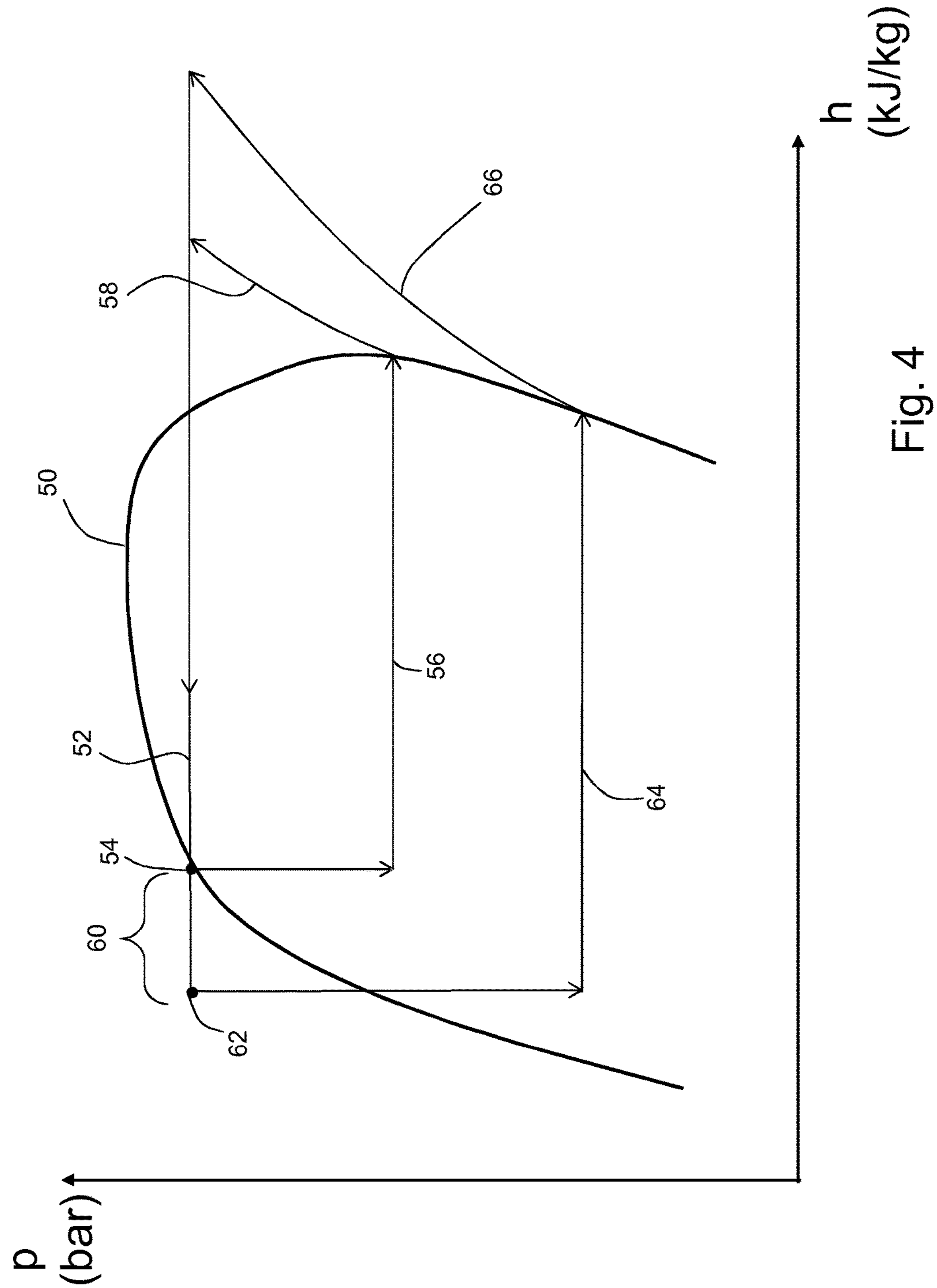
FIG. 4 illustrates a refrigerant property diagram representing p—pressure, and h—enthalpy of the refrigeration system illustrated in FIG. 1.

FIG. 4 illustrates a refrigerant property diagram representing p—pressure, and h—enthalpy of the refrigeration system 4 illustrated in FIG. 1. The diagram is a schematic representation of pressure and enthalpy changes of a refrigerant circulating in the refrigeration system 4. The curve 50 represents the complete transition of the refrigerant between liquid and gaseous phase, and vice versa. At the left hand end of the curve 50 the refrigerant is in liquid phase and at the right hand end of the curve 50 the refrigerant is in gaseous phase. Within the curve 50 the refrigerant is in both liquid and gaseous phase to various degrees. A horizontal line in the diagram represents an isobar moreover, a horizontal line within the curve 50 represents an isotherm. Moving from left to right along an isotherm in the diagram, the refrigerant is evaporating. Conversely, moving from right to left along an isotherm, the refrigerant is condensing.

The lines provided with arrows represent the pressure and specific enthalpy of the refrigerant as it circulates in the refrigeration system 4. The larger box, formed by the lines provided with arrows, represents circulation of refrigerant via the first conduit path 26. The smaller box, formed by the lines provided with arrows, represents circulation of refrigerant via the second conduit path 28.

The heat, or energy, Q, transferred by the refrigerant is the difference in specific enthalpy, Δh, times the mass flow, m', of the refrigerant, i.e. Δh×m'. Δh is represented by a distance along the h-axis in the diagram.

Part of the line 52 represents the condensation of the refrigerant in the condenser 12. At point 54 the refrigerant is subject to a pressure drop in the second expansion arrangement 16, when the refrigerant flows through the second conduit path 28. Line 56 represents evaporation of the refrigerant in the second refrigerant channel 24 of the sub-cooler 20. Line 58 represents compression in the compressor 12 of the refrigerant coming from the second conduit path 28. When the refrigerant instead flows through the first conduit path 26, the refrigerant is sub-cooled in the first refrigerant channel 22 of the sub-cooler 20. This is represented by the left hand end 60 of the line 52. At point 62 the refrigerant is subject to a pressure drop in the first expansion arrangement 14, when the refrigerant flows through the first conduit path 26. Line 64 represents evaporation of the refrigerant in the first evaporator 18. Line 66 represents compression in the compressor 12 of the refrigerant coming from the first conduit path 26.

As can be seen from the length of line 64 in the diagram, owing to the sub-cooling of the refrigerant in the first refrigerant channel 22 of the sub-cooler 20, the energy available for cooling in the first evaporator 18 is more than if no sub-cooling would be provided, i.e. the line 64 would in such case only start substantially vertically below point 54.

Figure 5:
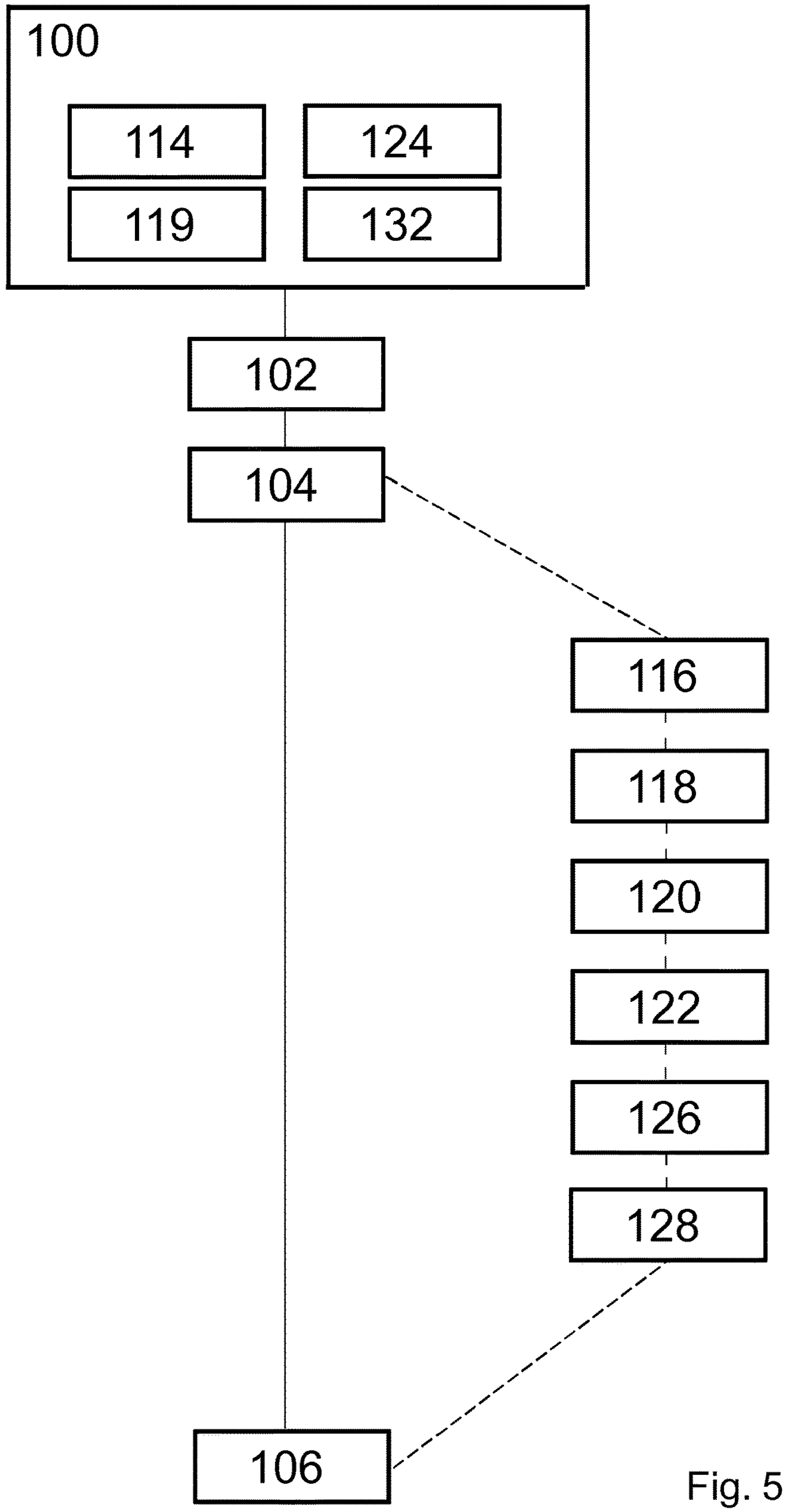
FIG. 5 illustrates a method of controlling the refrigeration system of a refrigerator.

FIG. 5 illustrates a method of controlling the refrigeration system 4 of a refrigerator 2 according to aspects and embodiments described herein. The method comprises:

- running 100 the compressor 10 when a first temperature condition of the refrigerator 2 is fulfilled,
- setting 102 the flow control device 30 in a sub-cooling setting to direct the flow of refrigerant through the second conduit path 28 for a sub-cooling duration,
- setting 104 the flow control device 30 in a first evaporator setting to direct a flow of refrigerant through the first conduit path 26 for a first evaporation duration, one sub-cooling duration and one first evaporation duration together forming a cycle, and
- stopping 106 the compressor 10 when a second temperature condition of the refrigerator 2 is fulfilled. In this manner a method of controlling of the refrigerator 2 is achieved, which provides an energy efficient operation of the refrigerator 2. In the sub-cooling setting, the sub-cooler 20 is cooled by refrigerant flowing through the second conduit path 28 and the second channel 24 of the sub-cooler 20. In the first evaporator setting, the refrigerant is cooled in the sub-cooler 20 as it flows through the first channel 22 of the sub-cooler 20 before it expands in the first expansion arrangement 14. The first and second temperature conditions of the refrigerator 2 may for instance be temperature conditions inside the first compartment 6 and/or inside the second compartment 40, and/or temperature conditions of the first evaporator 18 and/or the second evaporator 44.

According to embodiments, the first temperature condition may relate to a first maximum temperature threshold inside the first compartment 6, and the second temperature condition may relate to a first minimum temperature threshold inside the first compartment 6.

According to embodiments, the first temperature condition and second temperature condition may relate to an average temperature inside the first compartment 6. In these embodiments the average temperature may be calculated over one cycle or a number of cycles. The first and second temperature conditions may be a number of degrees above and below the average temperature.

According to embodiments, the method may comprise:

- measuring 114 a super-heating temperature difference of the first evaporator when the flow control device 30 is in the first evaporation setting during running 100 the compressor 10,
- decreasing 116 the length of the cycle if the super-heating temperature difference exceeds a maximum temperature difference, and
- increasing 118 the length of the cycle if the super-heating temperature difference is less than a minimum temperature difference. In this manner the length of the cycle may be adapted to present a method of controlling the refrigerator 2, which method provides an energy efficient operation of the refrigerator 2, based on the super-heating temperature difference, i.e. the temperature difference between the inlet and outlet of the first evaporator 18.

According to embodiments, the method may comprise:

- measuring 119 a temperature of the sub-cooler during running 100 the compressor 10,
- increasing 120 the sub-cooling duration and decreasing the first evaporation duration during the cycle if the temperature of the sub-cooler exceeds a third maximum temperature, and
- decreasing 122 the sub-cooling duration and increasing the first evaporation duration during the cycle if the temperature of the sub-cooler is less than a third minimum temperature. In this manner a temperature of the sub-cooler 20 may be maintained within a temperature range, which presents a method of controlling the refrigerator 2, which method provides an energy efficient operation of the refrigerator 2. The temperature range is defined by the third maximum temperature and the third minimum temperature. Within the temperature range the refrigerant is sub-cooled in the first refrigerant channel 22 of the sub-cooler to the extent that a contribution to the difference in specific enthalpy, Δh, available in the first evaporator 18 is achieved.

According to embodiments, the method may comprise:

- measuring 124 a temperature fluctuation of the sub-cooler during running 100 the compressor 10,
- decreasing 126 the length of the cycle if the temperature fluctuation exceeds a maximum temperature fluctuation, and
- increasing 128 the length of the cycle if the temperature fluctuation is less than a minimum temperature fluctuation. In this manner temperature deviation of the sub-cooler 20 may be kept within a limited temperature range, which provides a method of controlling the refrigerator 2, which method provides an energy efficient operation of the refrigerator 2. Again, within the limited temperature range the refrigerant is sub-cooled in the first refrigerant channel 22 of the sub-cooler to the extent that a contribution to the difference in specific enthalpy, Δh, available in the first evaporator 18 is achieved.

According to embodiments, the method may comprise:

controlling 130 a length of the sub-cooling duration and a length of the first evaporation duration based on a minimum temperature threshold of the sub-cooler and a maximum temperature threshold of the sub-cooler. In this manner e.g. the flow control device 30 may be easily controlled.

According to embodiments, the method may comprise:

repeating 132 the cycle one or more times during running 100 the compressor 10. In this manner the second temperature condition may be reached also with short cycles, one of which would not suffice to reach the second temperature condition.

An advantage of the methods according to embodiments and aspects presented herein is that control of the refrigerator 2 and the refrigeration system 4 does not require any variable expansion arrangements.

Example embodiments described above may be combined as understood by a person skilled in the art. Although the invention has been described with reference to example embodiments, many different alterations, modifications and the like will become apparent for those skilled in the art. For instance, the compressor 10 may be a single speed or a variable speed compressor. Therefore, it is to be understood that the foregoing is illustrative of various example embodiments and that the invention is defined only the appended claims.

As used herein, the term "comprising" or "comprises" is open-ended, and includes one or more stated features, elements, steps, components or functions but does not preclude the presence or addition of one or more other features, elements, steps, components, functions or groups thereof.

The invention claimed is:

1. A refrigerator comprising a refrigeration system being at least intermittently flowed through by a refrigerant and a first compartment cooled by the refrigeration system, wherein the refrigeration system comprises a system of conduits and system components, the system of conduits interconnecting the system components, wherein the system components comprise a single compressor, a condenser, a first expansion arrangement, a second expansion arrangement, a first evaporator, and a sub-cooler comprising a first refrigerant channel and a second refrigerant channel, and wherein the refrigeration system comprises a first conduit path and a second conduit path, the first conduit path comprising the first refrigerant channel, the first expansion arrangement, and the first evaporator, and the second conduit path comprising the second expansion arrangement and the second refrigerant channel, wherein the first and second conduit paths extend in parallel, wherein a flow control device for alternately directing refrigerant through the first conduit path and the second conduit path is arranged in the refrigeration system and wherein the flow control device includes a first valve disposed in the first conduit path between the condenser and the sub-cooler at a location downstream of the condenser and upstream of the sub-cooler, and a control system including temperature sensors disposed in thermal communication with at least one of the first compartment, the first evaporator and the sub-cooler, the control system configured to:

running the single compressor when the first compartment is at a first predetermined temperature, while running the single compressor, position the flow control device in a sub-cooling setting to direct the flow of refrigerant through the second conduit path for a sub-cooling duration, position the flow control device in a first evaporator setting to direct a flow of refrigerant through the first conduit for a first evaporation duration and measuring a super-heating temperature difference of the first evaporator, the sub-cooling duration and the first evaporation duration together forming a cycle wherein a length of the cycle is decreased if the super-heating temperature difference exceeds a maximum temperature difference and the length of the cycle is increased if the super-heating temperature difference is less than a minimum temperature difference, and after positioning the flow control device in the first evaporator setting, stopping the compressor when the first compartment is at a second predetermined temperature.

2. The refrigerator according to claim 1, wherein the sub-cooler forms a thermal energy storage unit.

3. The refrigerator according to claim 1, wherein at least part of the flow control device is arranged downstream of the condenser.

4. The refrigerator according to claim 1, wherein the flow control device comprises a valve in the first conduit path arranged downstream of the first evaporator and upstream of the single compressor.

5. The refrigerator according to claim 1, wherein the system of conduits extends, in the flow direction of the refrigerant, from the single compressor to the condenser, and from the condenser to the flow control device.

6. The refrigerator (2) according to claim 1, wherein refrigerator (2) comprises a second compartment (40), and wherein also the second conduit path (28) comprises the first evaporator (18).

7. The refrigerator according to claim 1, wherein the first and second conduit paths divide downstream of the condenser.

8. The refrigerator according to claim 1, wherein the first and second conduit paths meet upstream of the single compressor.

9. The refrigerator according to claim 1, wherein the first expansion arrangement is arranged downstream of the first refrigerant channel of the sub-cooler and upstream of the first evaporator.

10. The refrigerator (2) according to claim 1, wherein a third expansion arrangement (46) is arranged in the first conduit path (26), the third expansion arrangement (46) being arranged downstream of the condenser (12) and upstream of first refrigerant channel (22) of the sub-cooler (20).

11. The refrigerator according to claim 1, wherein an accumulator is arranged in the second conduit path.

12. The refrigerator according to claim 1, wherein the first refrigerant channel and the second refrigerant channel are spaced apart from each other and extend through the sub-cooler, the first refrigerant channel connected to the first conduit path and the second refrigerant channel connected to the second conduit path.

13. The refrigerator according to claim 1, wherein the control system is configured to alternate between positioning the flow control device in the sub-cooling setting and positioning the flow control device in the first evaporator setting while the compressor is running.

14. The refrigerator according to claim 1, wherein the flow control device is disposed between the condenser and sub-cooler at a location downstream of the condenser and upstream of the sub-cooler.

15. The refrigerator (2) according to claim 1, wherein the refrigerator (2) comprises a second compartment (40) and the second conduit path (28) comprises a second evaporator (44).

16. The refrigerator (2) according to claim 15, wherein the second refrigerant channel (24) of the sub-cooler (20) is arranged upstream of the second evaporator (44).

17. The refrigerator (2) according to claim 15, wherein the second evaporator (44) comprises the second refrigerant channel (24) of the sub-cooler (20).

18. A method of controlling the refrigeration system (4) of a refrigerator (2) according to claim 1, the method comprising:

running (100) the single compressor (10) when a first temperature condition of the refrigerator (2) is fulfilled, setting (102) the flow control device (30) in a sub-cooling setting to direct the flow of refrigerant through the second conduit path (28) for a sub-cooling duration, setting (104) the flow control device (30) in a first evaporator (18) setting to direct a flow of refrigerant through the first conduit path (26) for a first evaporation duration, the sub-cooling duration and the first evaporation duration together forming a cycle, and stopping (106) the single compressor (10) when a second temperature condition of the refrigerator (2) is fulfilled.

19. The method according to claim 18, wherein the first temperature condition relates to a first maximum temperature threshold inside the first compartment (6), and the second temperature condition relates to a first minimum temperature threshold inside the first compartment (6).

20. The method according to claim 18, wherein the first temperature condition and second temperature condition relate to an average temperature inside the first compartment (6).

21. The method according to claim 18, the method comprising:

measuring (114) a super-heating temperature difference of the first evaporator (18) when the flow control device (30) is in the first evaporation setting during running (100) the single compressor (10), decreasing (116) the length of the cycle if the super-heating temperature difference exceeds a maximum temperature difference, and increasing (118) the length of the cycle if the super-heating temperature difference is less than a minimum temperature difference.

22. The method according to claim 18, the method comprising:

measuring (119) a temperature of the sub-cooler (20) during running (100) the single compressor (10), increasing (120) the sub-cooling duration and decreasing the first evaporation duration during the cycle if the temperature of the sub-cooler (20) exceeds a third maximum temperature, and decreasing (122) the sub-cooling duration and increasing the first evaporation duration during the cycle if the temperature of the sub-cooler (20) is less than a third minimum temperature.

23. The method according to claim 18, the method comprising:

measuring (124) a temperature fluctuation of the sub-cooler (20) during running (100) the single compressor (10), decreasing (126) the length of the cycle if the temperature fluctuation exceeds a maximum temperature fluctuation, and increasing (128) the length of the cycle if the temperature fluctuation is less than a minimum temperature fluctuation.

24. The method according to claim 18, the method comprising:

controlling (130) a length of the sub-cooling duration and a length of the first evaporation duration based on a minimum temperature threshold of the sub-cooler (20) and a maximum temperature threshold of the sub-cooler (20).

25. The method according to claim 18, the method comprising:

repeating (132) the cycle one or more times during running (100) the single compressor (10).

* * * * *